A. ELLISON.
AUTOMATIC NUT LOCK.
APPLICATION FILED FEB. 18, 1916.
1,191,955. Patented July 25, 1916.
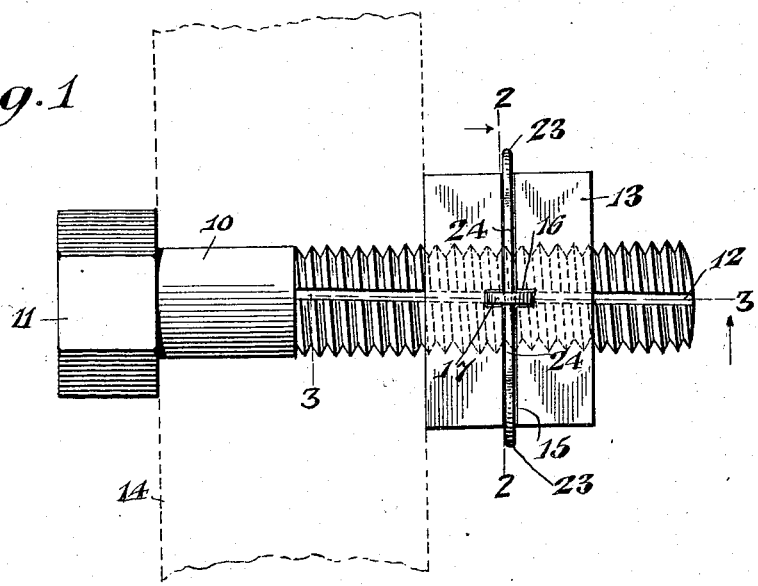
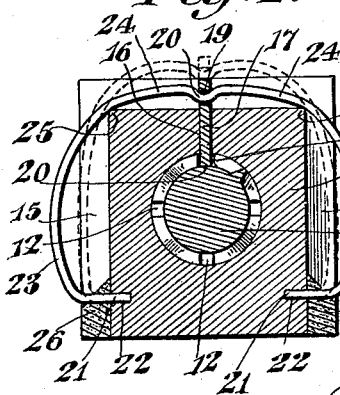
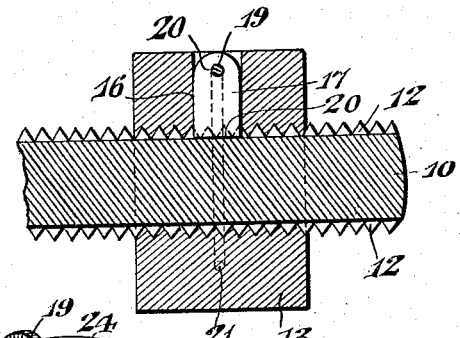
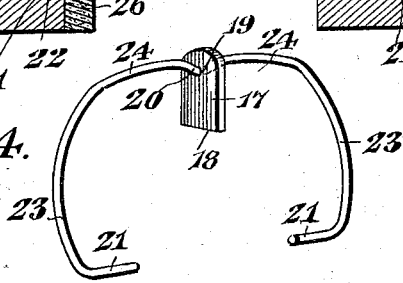
WITNESSES: Arthur Ellison, INVENTOR
BY
Attorney

UNITED STATES PATENT OFFICE.

ARTHUR ELLISON, OF TWIG, MINNESOTA.

AUTOMATIC NUT-LOCK.

1,191,955.  Specification of Letters Patent.  Patented July 25, 1916.

Application filed February 18, 1916. Serial No. 79,186.

*To all whom it may concern:*

Be it known that I, ARTHUR ELLISON, a citizen of the United States, residing at Twig, in the county of St. Louis and State of Minnesota, have invented a new and useful Automatic Nut-Lock, of which the following is a specification.

The present invention relates to an improved nut and bolt lock, and has as an object to provide a device of this nature, which is automatic in action, or in which as the nut is turned up on the bolt and tightened, the nut lock interlocks the nut to the bolt and prevents retrograde movement of the nut, which is usually effected by vibration, movement of parts in frictional engagement with the nut and bolt, and other ordinary causes.

It is another object of the invention to form a nut lock, which is of simple construction, relatively few parts, and which may be economically produced without the peculiar formation or enlarging of any of the elements which comprise the nut lock.

Broadly, the invention provides a bolt having a number of longitudinal recesses in its threaded portion, a nut threaded on the bolt in the usual manner, and adapted to be turned up upon the same to tighten the nut and bind the bolt in the object to which it is secured, to provide the nut with a peripheral groove extending over half way around the same, seating a spring of substantially U-shape in this groove and projecting the opposite arms or sides of the spring beyond the peripheral edge of the nut, and mounting a pawl radially in the nut with its outer end projecting into the groove and engaging the spring. The spring is so bent that it normally urges the pawl inwardly into one of the recesses of the bolt. The sides of the spring are adapted to be compressed by a wrench to contract the sides and bulge the middle portion of the spring outwardly, and lift the pawl out of the recess in the bolt to thus free the nut.

The above and other objects and advantages of this invention will appear from the following detail disclosure of the present preferred embodiment of the invention, the same being illustrated in the accompanying drawing, wherein—

Figure 1 is a side elevation of a nut and bolt having the automatic nut lock of this invention applied thereto. Fig. 2 is a transverse section through the same on the line 2—2, showing the peripheral groove in the nut and the spring therein, and the position of the pawl, which is normally urged inwardly for engagement with the bolt, the dotted lines showing the spring contracted and the pawl released from the bolt. Fig. 3 is a longitudinal central section, taken through the nut and bolt with the improved nut lock, on the line 3—3 of Fig. 1, showing the relatively wide pawl and the wire spring passing through the outer end thereof. Fig. 4 is a detail perspective view of the spring and the pawl carried thereby.

Referring to this drawing, wherein like parts are designated by similar numerals of reference throughout the several views, 10 designates a bolt of substantially the usual construction having a head 11, but which is provided in the threaded portion thereof with a plurality of longitudinal recesses 12. The recesses 12, as shown best in Fig. 2, are preferably four in number, so that at each quarter turn of the nut 13 on the bolt, the device will be in position to be locked. The nut 13 is of the usual polygonal type, having any number of wrench receiving faces, four being shown in the present instance for the purpose of illustration. In Fig. 1, the nut 13 is shown as being turned up upon the bolt 10 against an object 14, in order to bind the bolt head 11 against one side of the object and the nut 13 against its opposite side. From Fig. 2, it will be seen that the nut 13 has a peripheral groove 15 which extends over half way around the nut, and which is of substantial depth. This groove 15 is shown as extending around three sides of the four sided nut here shown. It is necessary to extend the groove 15 over half way around any form of nut in order to accomplish the features of this invention. The nut 13 also has a radial slot 16 in one side and at the intermediate portion of the groove 15. This radial slot 16 is shallow, but relatively wide to accommodate a flat metal pawl 17, which is fitted in the slot 16 and adapted for radial movement in the nut 13. This pawl 17 is of such form that it may be stamped from sheet metal. The pawl has an inner flat edge 18 adapted to conform to some extent with the peripheral surface of the bolt 10, as shown in Fig. 2. The outer end of the pawl 17 is provided with a transverse aperture forming an eye 19 through which is engaged the intermediate offset portion 20 of a spring. As shown to advantage in Figs. 2 and 4, this spring comprises a single length of wire uniform in diameter and contour from end to end, and being bent into substantially U-shape. The opposite ends of the spring are turned inwardly at an abrupt angle to provide a pair of opposed anchoring fingers 21 adapted to fit snugly in sockets or openings 22 formed in the opposite sides of the nut 13, and preferably at or adjacent the opposite ends of the groove 15.

The spring is adapted to be sprung over the side of the nut 13 and into the groove 15. The anchoring fingers 21 are forced into the openings 22 and held therein by the inherent tension of the spring. The anchoring fingers 21 rigidly hold the free ends of the spring from inward movement, and hold the opposite sides 23 of the spring in bowed position outwardly beyond the peripheral edge of the nut 13, and at the opposite sides thereof. The tension of the spring draws the bridge portions 24 thereof into the intermediate part of the groove 15. The inward movement of the bridge portion 24 is limited by its seating against the shoulders 25 formed at the opposite ends of the intermediate side of the nut 13. The offset portion 20 of the spring is forced inwardly and caused to move and yieldingly hold the pawl 17 inwardly against the bolt 10. The pawl 17 being formed of sheet metal, and being relatively broad, provides for a relatively long and effective locking edge, which binds in the recesses 12 of the bolt. The pawl 17 engages against the opposite flat walls of the slot 16, so that the nut 13 takes up the pressure of the pawl and the spring is relieved of all tension or pressure incident to the force exerted to unscrew the nut from the bolt. It is thus observed that from such a structure the pawl 17 is normally urged inward against the bolt, so that the bolt and the nut are at all times held locked from turning in either direction. When it is desired to turn the nut, a wrench, or the like, is placed over the nut, so that the jaws thereof engage the opposite sides of the nut, and the opposite sides 23 of the spring. When the wrench is properly tightened upon the nut 13, the sides 23 of the spring are compressed into the desired position, shown in dotted lines in Fig. 2. This compression of the sides 23 tends to collapse the spring, and owing to the anchoring fingers 21, the free ends of the spring cannot move inwardly toward each other, so that the tension placed upon the sides 23 forces the bridge portion 24 outwardly from the groove 15 and thus moves the pawl 17 radially outward. The wrench may be turned in either direction and as many times as is desired to properly position the nut on the bolt. As soon as the wrench is removed from the nut, if the pawl 17 does not register with a recess 12 in the bolt, the nut 13 may be given a slight turn in either direction, the turn never being more than a quarter turn to register the inner end 18 of the pawl with the adjacent recess 12 of the bolt. As soon as the pawl registers with the recess, the spring snaps the pawl 17 into the recess and thus locks the nut upon the bolt. The device always tends to lock the parts together and thus automatically holds the pawl in such position as to lock the nut, should it be left adjusted with the pawl between the recesses 12, upon the slight turning of the nut 13 in either direction.

If desired, the fingers 21 of the spring may be held in the openings 22, and in the ends of the groove 15, by solder 26.

What is claimed is:—

1. In a nut lock, the combination with a longitudinally recessed bolt, a nut threaded upon the bolt and having a peripheral groove therein and a radial slot intersecting the recess, a pawl carried by the nut in said slot, and a spring snapped into said groove and engaging the outer end of said pawl, said spring being adapted to yieldingly hold said pawl inwardly against said bolt and having its opposite sides bowed outwardly beyond the peripheral edge of the nut.

2. In a nut and bolt lock, a bolt having longitudinal recesses in the sides thereof, a nut threaded on the bolt and having a radial slot in one side and a peripheral groove intersecting the outer end of the slot, a pawl slidable in the slot for engagement in the recesses of the bolt, and a curved spring engaging in said groove and having connection at its intermediate portion with the outer end of said pawl, said spring having its opposite sides bowed outwardly beyond the peripheral edge of the nut whereby to press the intermediate portion of the spring inwardly and hold the pawl against the bolt, said sides being adapted to be compressed to flatten said spring and retract the pawl from engagement with the bolt.

3. In combination with a longitudinally grooved bolt, and a nut threaded upon the bolt having a radial slot therein, a pawl mounted in said slot and movable toward and away from the bolt, and a bowed spring having its ends rigidly fastened in the nut and its intermediate portion bent around the nut and connected to the outer end of the pawl, the sides of the spring being adapted to be compressed to flatten the same and retract the pawl from engagement with the bolt.

In testimony, that I claim the foregoing as my own, I have hereto affixed my signature in the presence of two witnesses.

ARTHUR ELLISON.

Witnesses:
  B. G. RILLING,
  C. W. OLSON.